US009811076B2

(12) United States Patent
Guo et al.

(10) Patent No.: US 9,811,076 B2
(45) Date of Patent: Nov. 7, 2017

(54) METHOD AND SYSTEM FOR COMMUNICATING PRODUCT DEVELOPMENT INFORMATION

(71) Applicant: Accenture Global Services Limited, Dublin (IE)

(72) Inventors: Ping Guo, Los Altos, CA (US); Sunny Webb, San Francisco, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 386 days.

(21) Appl. No.: 14/614,200

(22) Filed: Feb. 4, 2015

(65) Prior Publication Data
US 2016/0225193 A1      Aug. 4, 2016

(51) Int. Cl.
| G05B 15/02 | (2006.01) |
| G05B 19/4099 | (2006.01) |
| G06Q 10/10 | (2012.01) |
| B33Y 50/02 | (2015.01) |
| B33Y 50/00 | (2015.01) |

(52) U.S. Cl.
CPC .......... *G05B 19/4099* (2013.01); *B33Y 50/00* (2014.12); *B33Y 50/02* (2014.12); *G05B 15/02* (2013.01); *G06Q 10/101* (2013.01)

(58) Field of Classification Search
CPC .... G06B 19/4099; G06B 15/02; G06T 19/00; G06T 19/20; G05B 15/02; G05B 19/4099
USPC ......................................................... 700/98
See application file for complete search history.

(56) References Cited

U.S. PATENT DOCUMENTS

| 6,196,146 B1 * | 3/2001 | Goldberg | ............... D05B 19/10 |
| | | | 112/102.5 |
| 6,621,589 B1 | 9/2003 | Al-Kazily et al. | |
| 6,687,018 B1 | 2/2004 | Leong et al. | |
| (Continued) | | | |

FOREIGN PATENT DOCUMENTS

| JP | 2007072831 | 3/2007 |
| WO | 0219202 | 3/2002 |

(Continued)

OTHER PUBLICATIONS

Print To 3D, URL: http://web.archive.org/web/20150111233142/ http://www.printo3d.com/ published on Jan. 8, 2015.

(Continued)

*Primary Examiner* — Chun Cao
(74) *Attorney, Agent, or Firm* — Brinks Gilson & Lione

(57) ABSTRACT

A method for communicating product development information includes generating, by a server, a first interface configured to facilitate uploading data that defines a 3D image of a product to the server, and to facilitate specifying reviewer identifying data associated with one or more reviewers for reviewing the 3D image. The method also includes receiving, via the first interface, the 3D image and the reviewer identifying data; generating, by the server, a second interface that includes a viewer that facilitates viewing the 3D image and one or more fields for specifying feedback information related to the 3D image. The method also includes receiving, via the second interface, feedback information related to the 3D image; and communicating the feedback information to a designer associated with the 3D image.

18 Claims, 13 Drawing Sheets

(56) References Cited

U.S. PATENT DOCUMENTS

| | | |
|---|---|---|
| 6,714,915 B1 | 3/2004 | Barnard et al. |
| 7,088,462 B2 | 8/2006 | Bhogal et al. |
| 7,171,344 B2 * | 1/2007 | Lind .................... G06F 17/5009 700/98 |
| 7,689,966 B2 | 3/2010 | Verma et al. |
| 8,065,741 B1 | 11/2011 | Coblentz et al. |
| 8,069,091 B1 * | 11/2011 | Callen, Jr. .......... G06Q 30/0603 705/26.5 |
| 8,095,229 B2 * | 1/2012 | Muser .............. G05B 19/41805 700/82 |
| 8,548,868 B1 * | 10/2013 | Lawrence .......... G06Q 30/0605 705/26.2 |
| 8,938,679 B1 * | 1/2015 | Hsu ...................... G06F 3/0486 715/230 |
| 9,588,726 B2 * | 3/2017 | Webb ...................... G06F 3/126 |
| 9,604,406 B2 * | 3/2017 | Mahdavi ............. B29C 67/0051 |
| 2003/0046122 A1 | 3/2003 | Seymour |
| 2005/0021314 A1 * | 1/2005 | Rose ....................... G06F 17/50 703/1 |
| 2005/0030574 A1 | 2/2005 | McVey et al. |
| 2005/0076317 A1 | 4/2005 | Ling et al. |
| 2005/0114672 A1 | 5/2005 | Duncan et al. |
| 2007/0229896 A1 | 10/2007 | Fujimori et al. |
| 2007/0233436 A1 | 10/2007 | Ishikawa |
| 2008/0028323 A1 | 1/2008 | Rosen et al. |
| 2008/0151288 A1 | 6/2008 | Matsunoshita |
| 2009/0284527 A1 | 11/2009 | Ofek et al. |
| 2009/0319529 A1 | 12/2009 | Bartlett et al. |
| 2011/0308119 A1 | 12/2011 | Ecker et al. |
| 2012/0092724 A1 | 4/2012 | Pettis |
| 2012/0105903 A1 | 5/2012 | Pettis |
| 2012/0326356 A1 | 12/2012 | Martin |
| 2013/0024545 A1 | 1/2013 | Sheppard et al. |
| 2013/0124151 A1 | 5/2013 | Mech et al. |
| 2013/0176312 A1 | 7/2013 | Schouwenburg et al. |
| 2013/0235037 A1 | 9/2013 | Baldwin et al. |
| 2013/0257856 A1 * | 10/2013 | Hickman ................ G06T 13/20 345/419 |
| 2013/0297320 A1 | 11/2013 | Buser et al. |
| 2013/0329258 A1 | 12/2013 | Pettis et al. |
| 2014/0058959 A1 | 2/2014 | Isbjornssund et al. |
| 2014/0115345 A1 | 4/2014 | Maetz et al. |
| 2014/0122544 A1 | 5/2014 | Tran et al. |
| 2014/0156053 A1 | 6/2014 | Mahdavi et al. |
| 2014/0288699 A1 | 9/2014 | Williams et al. |
| 2014/0309765 A1 | 10/2014 | Blanchfield |
| 2015/0021830 A1 | 1/2015 | Yerazunis et al. |
| 2015/0057784 A1 * | 2/2015 | Butler ................ B29C 67/0088 700/119 |
| 2015/0058282 A1 * | 2/2015 | Saraya ................ G06Q 10/103 707/608 |
| 2015/0112644 A1 | 4/2015 | Schmidt |
| 2015/0120806 A1 | 4/2015 | Lippincott |
| 2015/0142153 A1 | 5/2015 | Chun et al. |
| 2015/0151492 A1 | 6/2015 | Schmidt |
| 2016/0107234 A1 | 4/2016 | Craeghs et al. |

FOREIGN PATENT DOCUMENTS

| | | |
|---|---|---|
| WO | 2012146943 A2 | 11/2012 |
| WO | 2013013146 A1 | 1/2013 |
| WO | 2015116336 | 8/2015 |

OTHER PUBLICATIONS

3D Model Repositories, URL: https://web.archive.org/web/20150202205657/http://3dprintingforbeginners.com/3d-model-repositories/, published on Feb. 2, 2015.

* cited by examiner

Fig. 7

METHOD AND SYSTEM FOR COMMUNICATING PRODUCT DEVELOPMENT INFORMATION

BACKGROUND

Field

This application relates to a communication system. In particular, this application describes a method and system for communicating product development information.

Description of Related Art

Product design typically involves collaboration between various members of a team. For example, a designer of the team may design an initial concept model of a product on a cad program. The designer may print hard copies of various views of the model, generate image files with data that defines a 3D representation of the model, and/or have a physical sample prepared. The designer may convey drawing files and the like to other members of the team to solicit feedback. For example, the designer may email drawing files, etc., to others and request comments. The designer may schedule one or more in-person meetings with other members of the team to allow the other team members to inspect the physical sample.

The typical outcome of such meetings is requests for revisions to the model. As such, the designer may revise the model and may arrange follow-up meetings with others to discuss the revised model. This process of review and revision repeats until all the members of the team are satisfied with the model.

One problem with this approach is that as a model evolves, it becomes more and more difficult to ascertain the reasons behind why certain changes were made to the model. For example, members of the team may have to search through email logs to track down a comment associated with a particular model version to ascertain why a particular change was made, which is a slow and burdensome process. This problem is compounded when various alternative designs branch from a root design.

Another problem is that most of the collaboration occurs via an email system, which may become cluttered with redundant information. For example, multiple instances of the same image file may reside within the inboxes of different reviewers. This redundant data decreases the performance of the email system and necessitates increased storage requirements for the email system.

Another problem with this approach is that the speed with which the collaboration occurs between team members is limited by reviewer availability. For example, a designer may have to waste time trying to find a common time and place where reviewers can come together to review the product. Then the designer may have to send out invite notices to reviewers, which takes even more time.

BRIEF SUMMARY

In one aspect, a method for communicating product development information is provided. The method includes generating, by a server, a first interface configured to facilitate uploading data that defines a 3D image of a product to the server, and to facilitate specifying reviewer identifying data associated with one or more reviewers for reviewing the 3D image. The method also includes receiving, via the first interface, the 3D image and the reviewer identifying data; generating, by the server, a second interface that includes a viewer that facilitates viewing the 3D image and one or more fields for specifying feedback information related to the 3D image. The method also includes receiving, via the second interface, feedback information related to the 3D image; and communicating the feedback information to a designer associated with the 3D image.

In a second aspect, a system for communicating product development information is provided. The system includes a server and a printing system. The server is configured to generate a first interface configured to facilitate uploading data that defines a three dimensional (3D) image associated with a product to the server, and to facilitate specifying reviewer identifying data associated with one or more reviewers for reviewing the 3D image. The server is further configured to receive the 3D image and the reviewer identifying data, generate a second interface that includes a viewer that facilitates viewing the 3D image and one or more fields for specifying feedback information related to the 3D image. The server is also configured to receive feedback information related to the 3D image; and to communicate the feedback information to a designer associated with the 3D image. The printing system is configured to receive, from the server, a request to 3D print the 3D image and to evaluate aspects of the 3D image to identify 3D printers capable of printing the 3D image. The printing system is further configured to receive a selection of a 3D printer that is capable of 3D printing the 3D image; and to communicate the 3D image to the selected 3D printer.

In a third aspect, a non-transitory machine-readable storage medium is provided. The non-transitory machine-readable storage medium has computer code stored thereon for communicating product development information. The operations include generating a first interface configured to facilitate uploading data that defines a 3D image of a product to the server, and to facilitate specifying reviewer identifying data associated with one or more reviewers for reviewing the 3D image; and receiving the 3D image and the reviewer identifying data. The operations also include generating a second interface that includes a viewer that facilitates viewing the 3D image and one or more fields for specifying feedback information related to the 3D image; receiving feedback information related to the 3D image; and communicating the feedback information to a designer associated with the 3D image.

BRIEF DESCRIPTION OF THE DRAWINGS

FIG. 7 illustrates a questionnaire page of the exemplary reviewer user interface for providing responses to questions related to the 3D image;

DETAILED DESCRIPTION

The embodiments described below overcome the problems above by providing a method and system for communicating product development information. The system centrally maintains various versions of 3D images along with comments and other feedback, and provides various user interfaces that streamline communications between a designer and one or more reviewers. Generally, the system is configured to generate a user interface that a designer of a product may utilize to: a) upload a 3D image of a product, b) specify reviewers for reviewing the 3D image, and c) specify questions related the 3D image to be answered by the reviewers. The user interface is configured to allow the designer to review the comments and answers to the questions provided by the reviewers. The user interface is also configured to allow the designer to upload new versions of the 3D image.

The system also generates a user interface that one or more reviewers may utilize to view a 3D image, provide comments regarding the 3D image, and provide responses to questions specified by the designer. The user interface is also configured to allow the reviewers to send the 3D image to a 3D printer capable of printing the 3D image. This allows the reviewers to get relatively fast access to a physical sample of the product, which will help them review the product.

Figure 1:
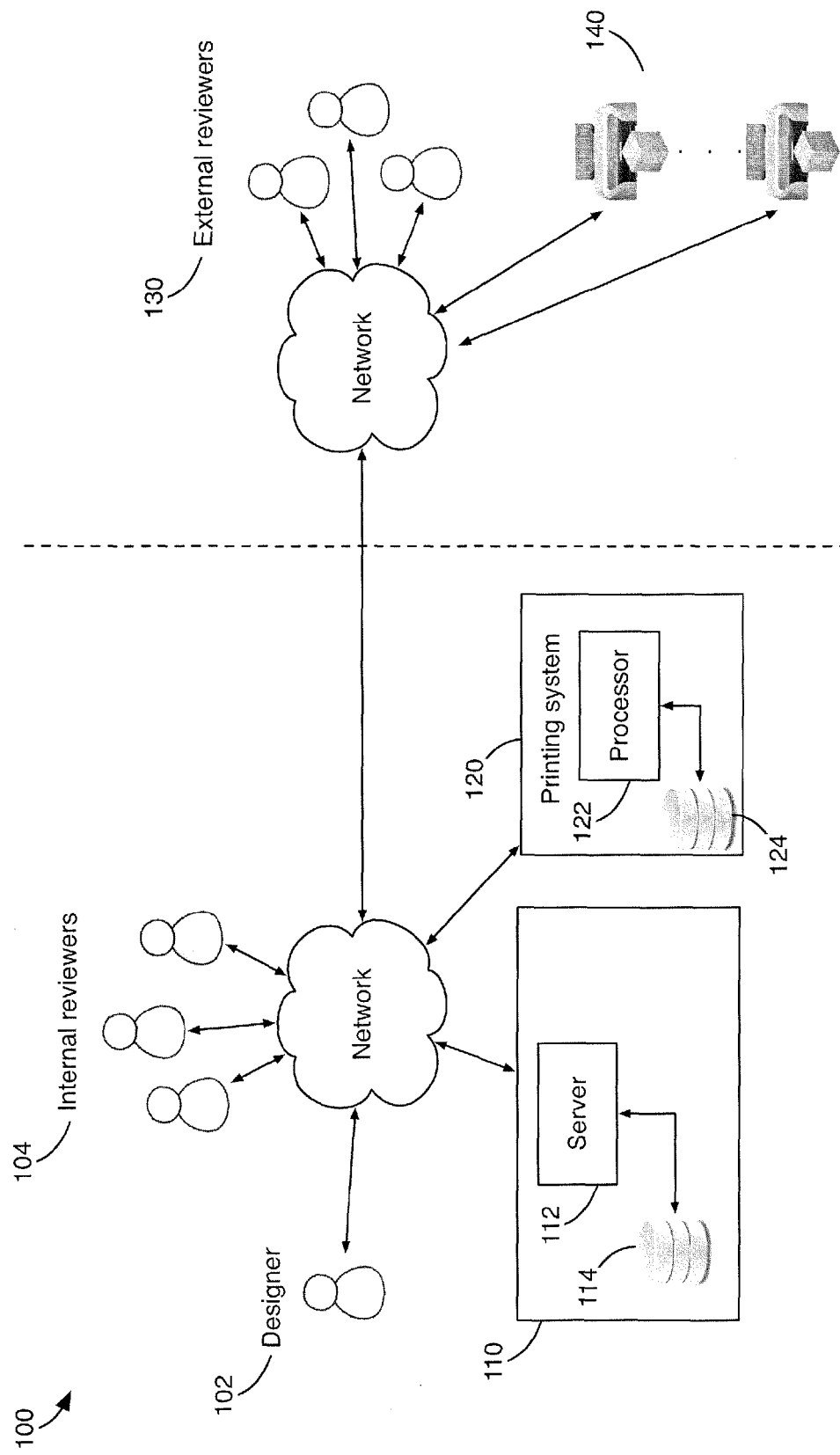
FIG. 1 illustrates an exemplary environment that includes a system configured to communicate product development information.
Figure 2:
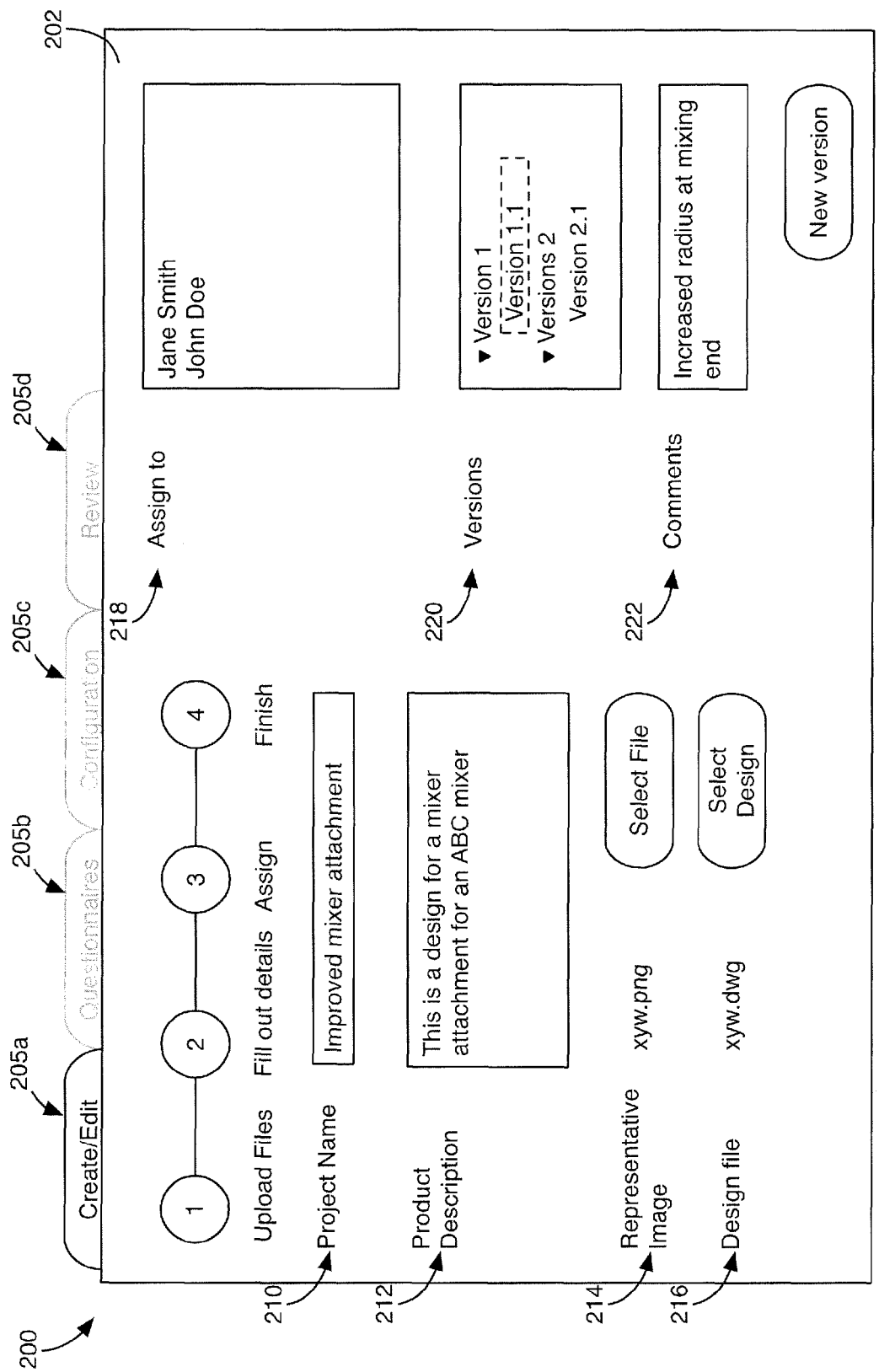
FIG. 2 illustrates a project creation/edit page of an exemplary designer user interface that facilitates uploading a 3D image of a product design to the system and that facilitates specifying project details.
Figure 3:
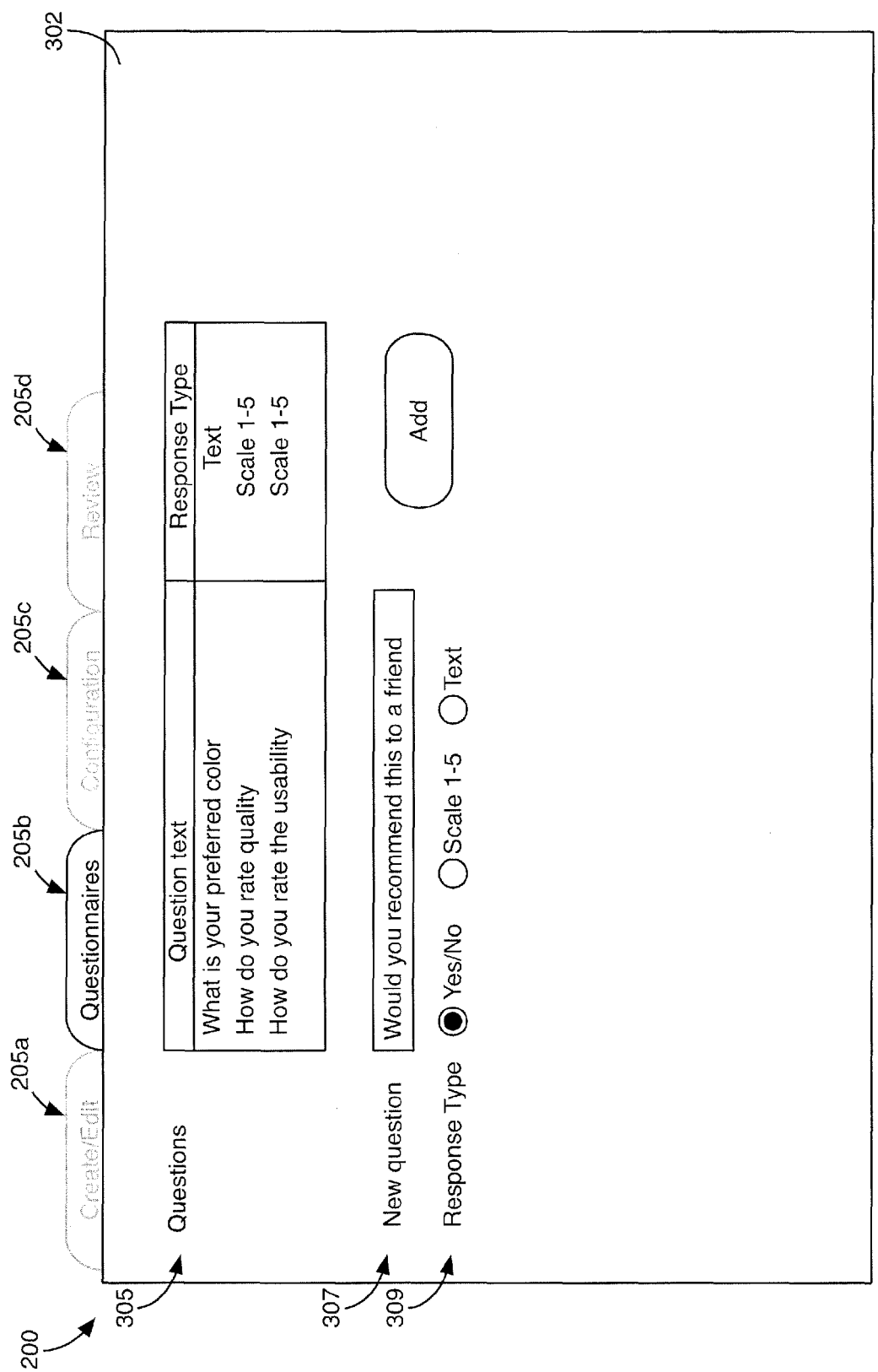
FIG. 3 illustrates a questionnaire creation page of the exemplary designer user interface for specifying questions related to the 3D image to be answered by reviewers.
Figure 4:
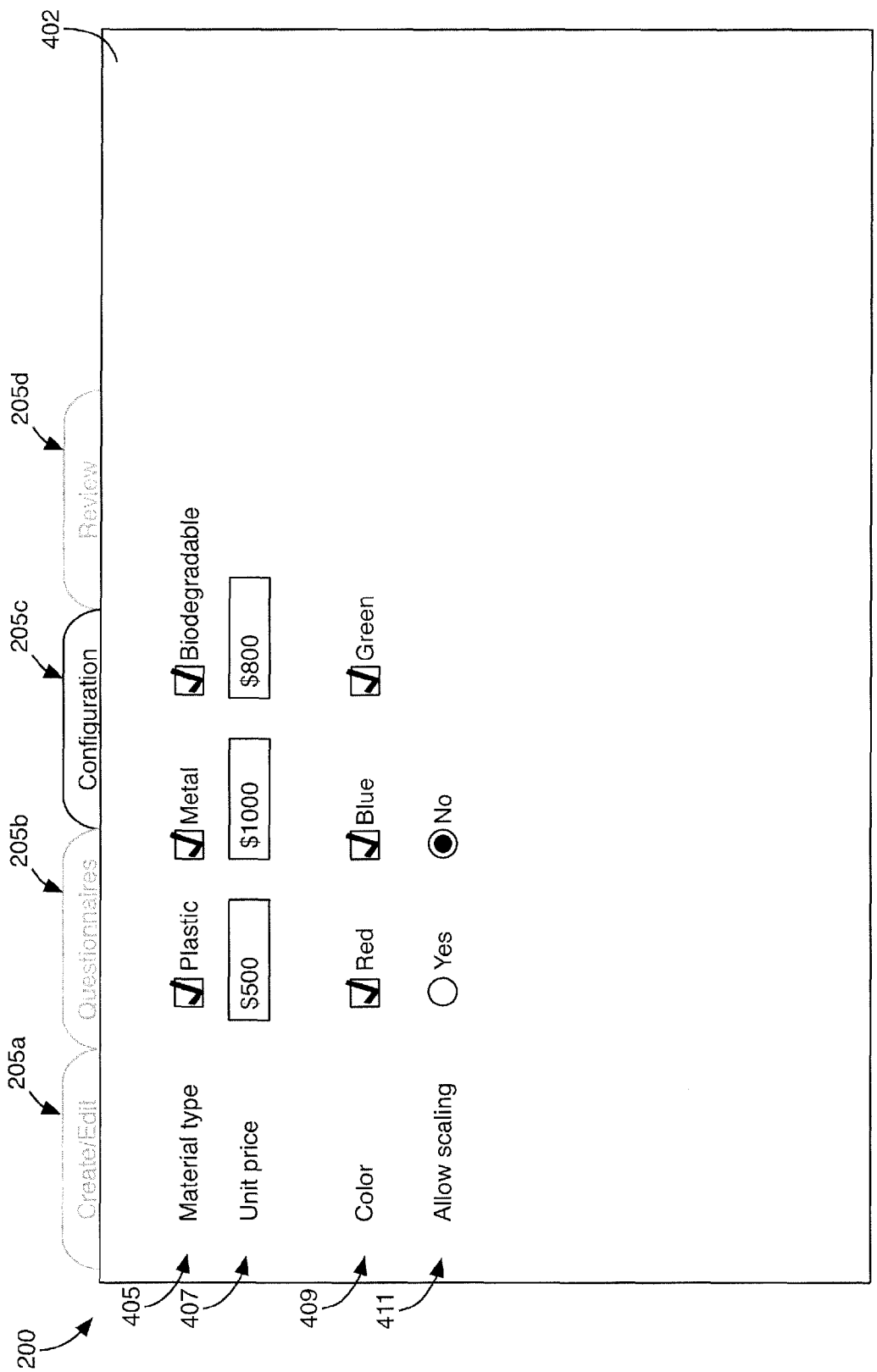
FIG. 4 illustrates a configuration page 402 of the exemplary designer user interface for specifying 3D printer configuration options that are available to reviewers when 3D printing the 3D image.
Figure 5:
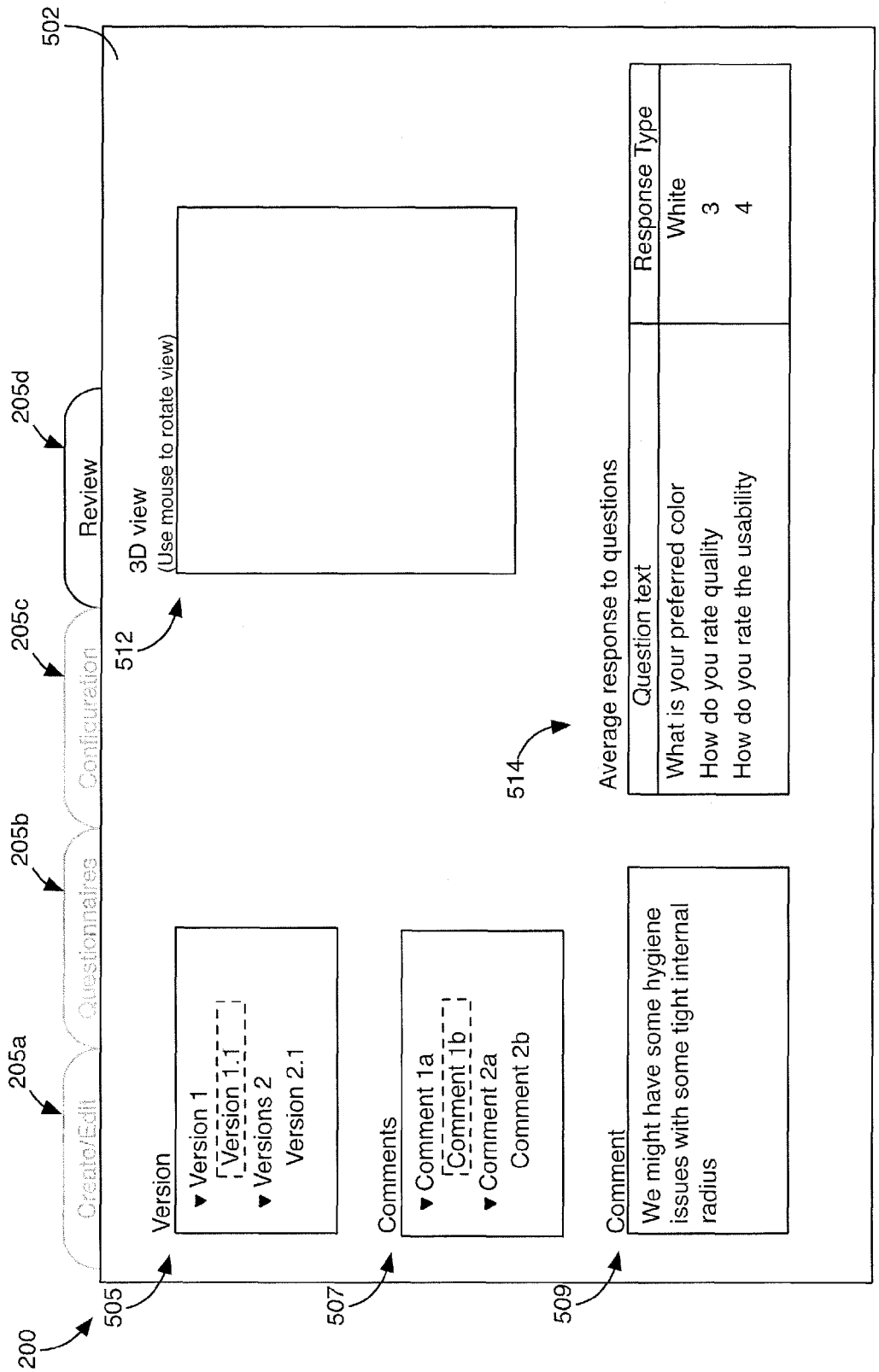
FIG. 5 illustrates a designer review page of the exemplary designer user interface for displaying reviewer feedback related to the 3D image.

FIG. 1 illustrates an exemplary environment 100 in which the system for communicating product development information operates. The left half of the illustration represents individuals and systems that may reside within an enterprise environment, such as within a corporate environment. The right half of the illustrated environment 100 represents individuals and systems that may reside outside of the enterprise environment. The various individuals and systems may be arranged differently. That is, one or more of the individuals and/or systems illustrated as belonging to the enterprise environment may reside outside of the enterprise environment. Likewise, one or more of the individuals and/or systems illustrated as being outside of the enterprise environment may reside within the enterprise environment.

The illustrated enterprise environment may include one or more designers 102 and internal reviewers 104. The designer 102 may correspond to an individual that develops a product. For example, the designer 102 may correspond to a product developer that utilizes a computer aided design (CAD) tool to design a product. The internal reviewers 104 may correspond to individuals within the enterprise tasked with reviewing the design, providing feedback on the design, and granting final approval of the design for external testing and/or production.

The designer 102 and the internal reviewers 104 collaborate on product development via the system 110. The system 110 may correspond to a computer system that implements a server 112, which is connected to a network such as the Internet. The computer system may correspond to an Intel®, AMD®, or PowerPC® based computer or a different computer. The computer system may execute an operating system, such as a Microsoft Windows®, Linux, Unix® or a different operating system.

The server 112 may implement a web server that generates various web pages that define user interfaces that allow the designer 102, internal reviewers 104, external reviewers 130, and possibly others to interact with the system 110. For example, the server 112 may generate and serve one or more user interfaces that facilitate generating a new project for a product with the system 110, specifying various attributes for the project, specifying reviewers who are tasked with reviewing the product, uploading various versions of 3D image files associated with the product, and viewing comments associated with the product.

The system 110 is also configured to generate one or more user interfaces that allow internal reviewers 104 to review the various versions of 3D images and to submit comments on the various versions. The user interface may also be configured to allow the reviewers to grant approval of the product.

The system 110 is further configured to generate one or more user interfaces that allow external reviewers 130 to review the various versions of the 3D image and to submit comments on the various versions. In this regard, the version viewable by the external reviewers 130 may be those versions that have been approved by the internal reviewers 104. The user interface presented to the external reviewers 130 may also be configured to display a questionnaire to the external reviewers 130 and to receive responses to questions in the questionnaire.

In some implementations, one or more of the user interfaces communicated to the internal and/or external reviewers 130 may be configured to allow a reviewer to communicate a 3D image file to a 3D printing service provider. In this regard, the system 110 may be configured to communicate the 3D model selected for printing to a printing system 120. The printing system 120 may be configured to identify a printer 140 capable of printing the 3D model and to communicate an image file associated with the 3D model to an appropriate printer.

The printing system 120 may correspond to the printing system disclosed in U.S. application Ser. No. 14/599,000, filed Jan. 16, 2015, which is hereby incorporated by reference in it entirety. For example, the printing system 120 may include a processor 122 configured to determine one or more printers 140 on which a given object may be printed. The processor 122 may be configured to determine object attributes such as the dimensions of the 3D image, the structural integrity of the 3D image, and the material requirements of the 3D image.

The processor 122 may be configured to identify printers capable of printing objects that possess the attributes determined above. In this regard, the processor 122 may search a printer database 124 for capable printers. The printer database 124 stores printer attribute data associated with one or more printers 140. Table 2 illustrates an exemplary record that includes attributes that may be stored in the printer database.

TABLE 2

| Printer | Location | Printer Type | Materials | Quantity of material | Lead time | Cost/part |
|---|---|---|---|---|---|---|
| ABC Printing Co. | Chicago | Maximus 5 3D printer | plastic, resin | 100% | 1 day | $100 |
| XYZ Printer Ltd. | New York | Integrity 7 3D printer | plastic, metal, ceramics | 50% | 10 day | $ 50 |

As illustrated, the printer attributes may include the location and type of printer 140. The printer attributes may specify the minimum and maximum size of objects that may be printed on a printer 140. The attributes may define the types of materials the printer 140 utilizes for printing objects along with the current material quantity on hand. Other printer attributes may be associated with the printers 140.

In instances where a suitable printer cannot be found, the printing system 120 may communicate this fact back to the reviewer that requested the printed object. For example, the processor 122 may determine that an object of a given size is not printable in the material specified by the designer 102. The processor 122 may report this issue to the reviewer and the reviewer may leave a comment regarding this issue with the designer 102.

FIGS. 2-5 illustrate various pages (202, 302, 402, and 502) of a designer user interface 200 that may be communicated to the designer 102. The designer 102 may select the different pages via page selection controls 205a-d. The designer user interface 200 is configured to allow the designer 102 to create and edit project data, upload different versions of a 3D image file associated with a product, specify questions for one or more questionnaires related to the product, and review comments and other forms of feedback provided by reviewers. Information entered via the designer user interface 200 and/or data displayed on the designer user interface 200 may be stored in the database 114 (FIG. 1).

A project creation/edit page 202 may include user interface elements that facilitate specifying a project name 210, product description 212 for providing an overall description of the product, a representative image 214 of the product, and design files 215 that corresponds to an initial version of the 3D image of the product, or new versions of the 3D image.

Also included is a reviewer assignment control 218 that facilitates assigning one or more reviewers tasked with reviewing the product, a version selection control 220 that facilitates selecting a previously stored version of the 3D image, and a comments field for providing comments associated with a particular version of the 3D image.

In operation, the designer 102 may upload any number of 3D image versions. In addition, the version selection control 220 may be configured to allow the designer to create a hierarchy of versions. That is, the designer 102 may create sub-versions of versions. This provides the designer 102 the ability to explore various variations of the 3D image.

A questionnaire creation page 302 may include user interface elements that facilitate specifying questions that will be part of a questionnaire communicated at a later point to the external reviewers 130. For example, the user interface elements may include a new question field 307 in which a question may be specified, and a response type field 309, which may be used to specify the type of response expected for the question. For example, the response type may be a yes/no response, a numeric value or range, or a text response. Other response types may be specified.

A question list 305 displays the text of the questions entered by the designer 102 along with the associated response type for the question. In some implementations, a new set of questions may be specified for each version of the 3D image file submitted to the system 110 for review. The items in the question list 305 may be stored in the database 114 and associated with a specific version of the 3D image.

A configuration page 402 may include user interface elements that facilitate specifying various configurations available for 3D printing the 3D image. For example, the user interface elements may include a material type field 405 for specifying different types of material that may be utilized for 3D printing the 3D image, such as plastic, metal, and biodegradable materials. Other materials may be specified. A cost field 407 may indicate the cost associated with 3D printing the 3D image using a given material. A color selector 409 may be utilized to indicate the type of color in which the 3D image may be 3D printed. A scale option 411 may be provided to allow a reviewer to specify a scale for the printed object. For example, a reviewer may desire to have the 3D image printed at a 1:2 scale to double the size of the printed version of the product. Other interface elements may be provided for specifying other options available when 3D printing the 3D image.

A designer review page 502 may include user interface elements that facilitate reviewing comments received from reviewers along with the results of the questionnaire. For example, the user interface elements may includes a version selection control 505 for selecting a specific version of the 3D image for which comments, etc., are sought. A comment selection control 507 may display a list of the comments provided for the selected 3D image version. A comment field 509 may include the text of the comment selected in the comment selection control 507.

A questionnaire response control 514 may display the results of the questionnaire. In this regard, the results may be aggregated or averaged to provide the most common/average response for a given question in the questionnaire. For example, the results of a question such as "rate the product on a scale of 1 to 5" may correspond to the average rating specified by the reviewers. The results may be displayed as a text result or in a different form. For example, results may be conveyed in the form of a chart or a different visual user interface element may be utilized.

Figure 6A:
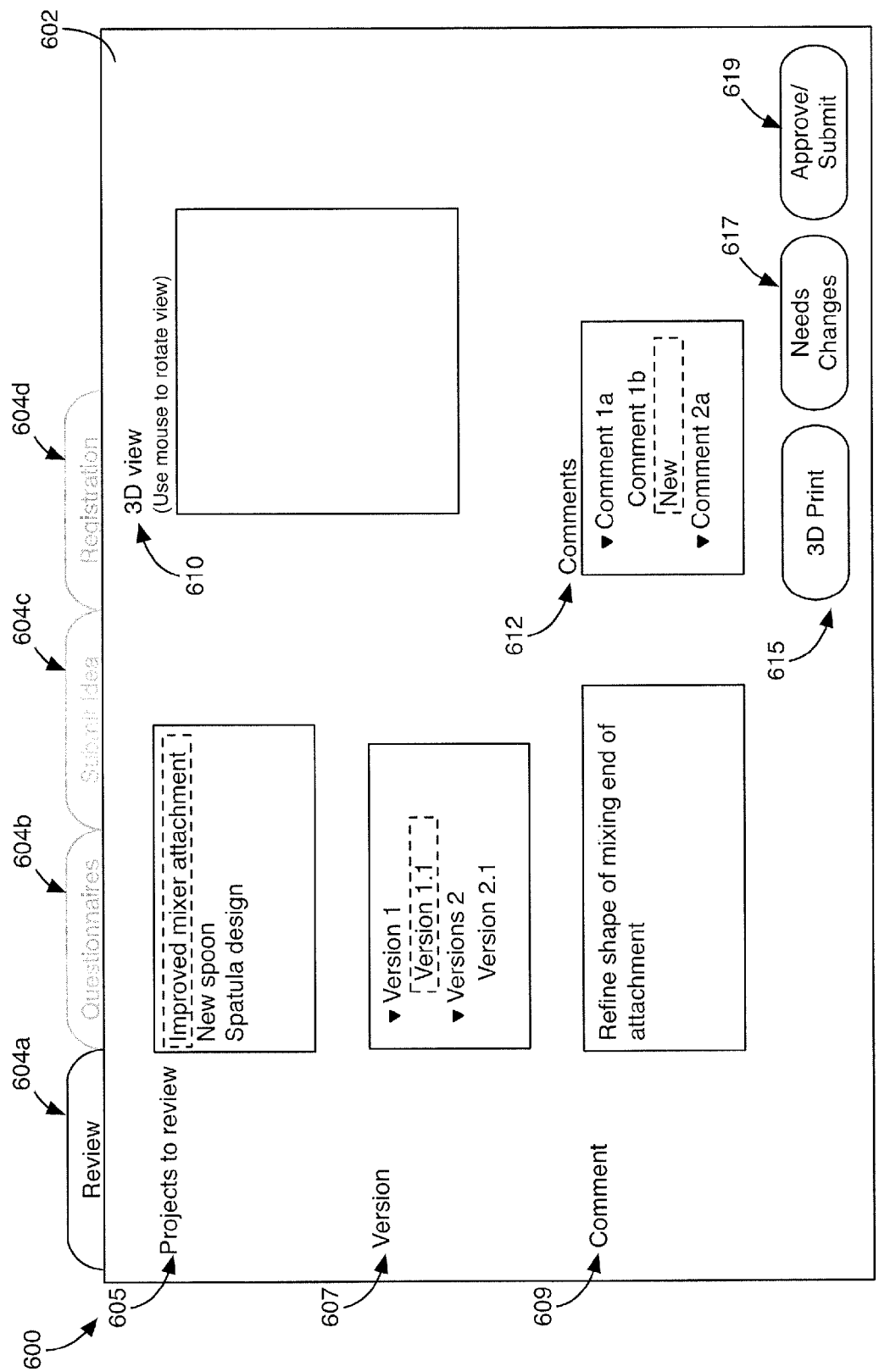
FIG. 6A illustrates a review page of an exemplary reviewer user interface for reviewing a 3D image.
Figure 7:
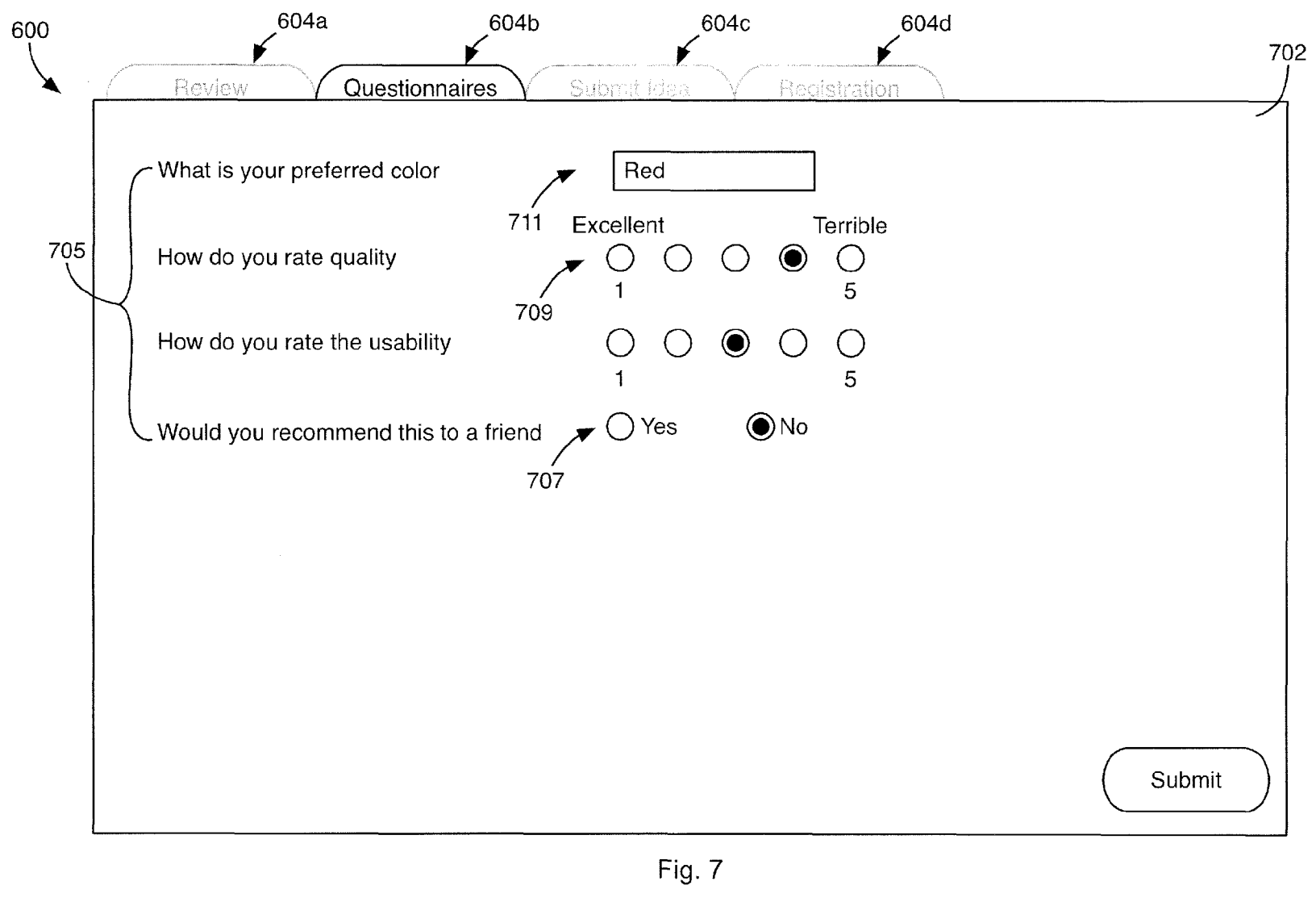

FIGS. 6A-7 illustrate various pages (602, 702, 802, 902) of a reviewer user interface 600 that may be communicated to the internal reviewers 104 and/or the external reviewers 130. External and/or internal reviewers (104,130) may select the different pages via page selection controls 604a-d. The reviewer user interface 600 is configured to allow the reviewers to view various versions of a 3D image and to provide comments regarding the various versions. The reviewer user interface 600 is also configured to display questionnaire questions and to receive responses to the questions. The reviewer user interface 600 is further configured to allow reviewers to 3D print 3D images under consideration and to approve a product for external reviewing, production, or for a different stage in the product development life cycle. Information entered via the reviewer user interface 600 and/or data displayed on the reviewer user interface 600 may be stored in the database 114 (FIG. 1). In some implementations, the reviewer user interface 600 is configured to allow external users to submit proposals for new products.

A review page 600 may include a project selection control 605 that facilitates selecting a project for review. Each project may be associated with a particular product. The first page 600 may also include a version selection control 607 that facilitates selection of a specific version of a 3D image associated with the product.

An image viewer 610 that displays the 3D image associated with the selected version may be provided. The image viewer 610 may correspond to a plug-in module configured to render the 3D image. The image viewer 610 may be configured to allow the reviewer to view different views of the 3D image, such as front, back, top, bottom, etc. In addition or alternatively, the image viewer 610 may be configured so that the reviewer can rotate the 3D image about one or more axis of the 3D image. Other controls, such as zoom and pan controls, may be provided to allow the reviewer to zoom into certain aspects of the 3D image.

The review page 600 may also include a comment field 609 that allows a reviewer to enter comments regarding the selected 3D image version. In some implementations, a comment selection control 612 may be provided to allow the reviewer to look at comments provided by others. Selection of a comment in the comment selection control 612 may cause the comment field 609 to display the selected comment. In some cases, the comments available for review may be limited. For example, it may be desirable to prevent external reviewers 130 from seeing comments posted by internal reviewers 104 and/or other reviewers.

Controls 617, 619 may be provided for indicating that changes are required and/or for indicating approval of the 3D image. In some implementations, the system 110 waits until all internal reviewers 104 have approved a given 3D image before making the approved 3D image viewable to external reviewers 130. When changes are indicated as being required, the system 110 may communicate an indication to the designer to this affect. For example, the system 110 may generate an email to the designer to inform the designer of a pending comment from a reviewer.

The review page 600 may also include a 3D print control 615 for sending a copy of the 3D image shown in the viewer to a 3D printer. Selection of this control 615 may cause the dialog box 640 illustrated in FIG. 6B to appear.

Figure 6B:
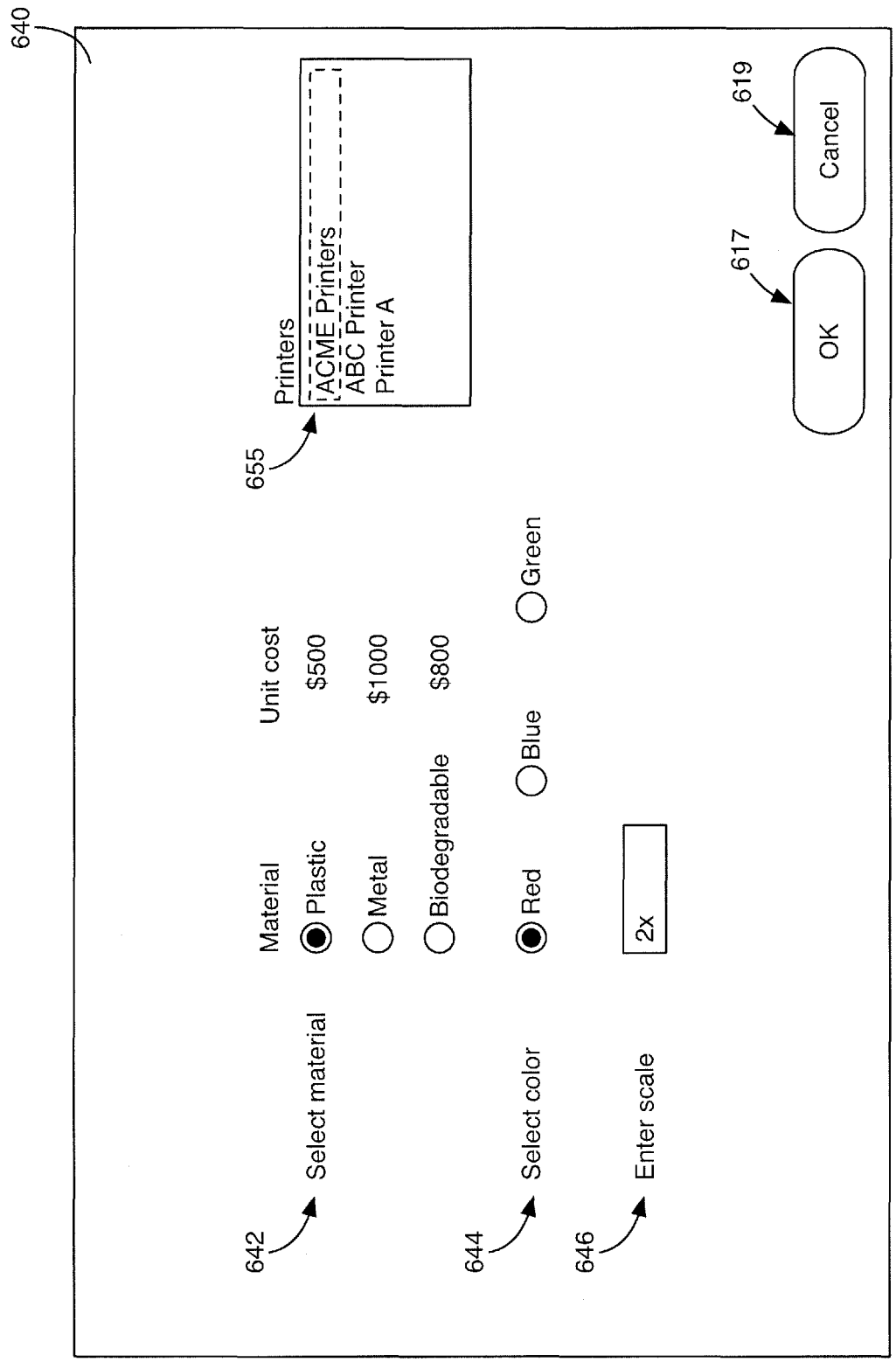
FIG. 6B illustrates an exemplary printer dialog box for selecting options when printing a 3D image.
Figure 8:
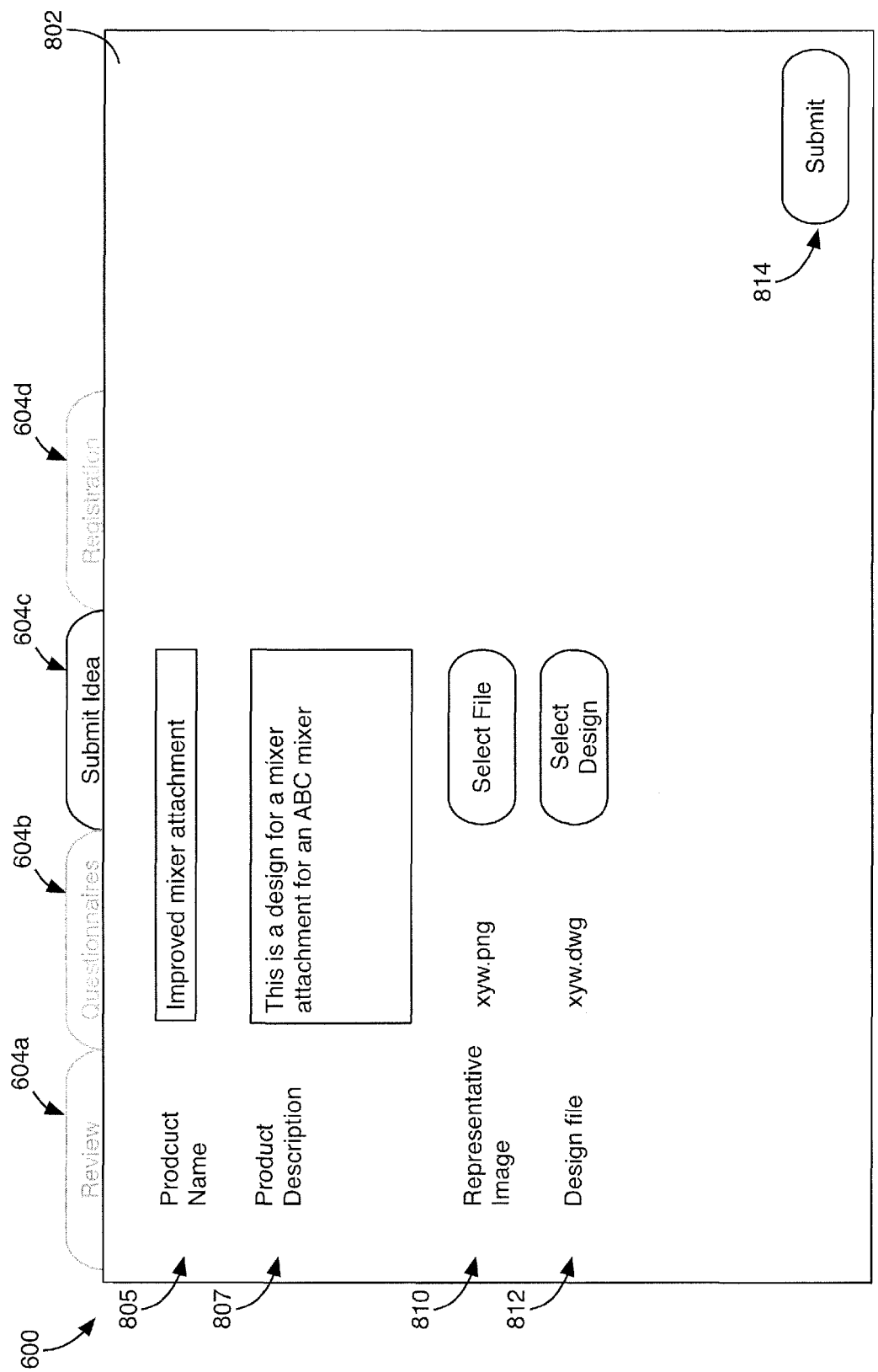
FIG. 8 illustrates a product submission page of the exemplary reviewer user interface for submitting a proposed product for consideration.
Figure 9:
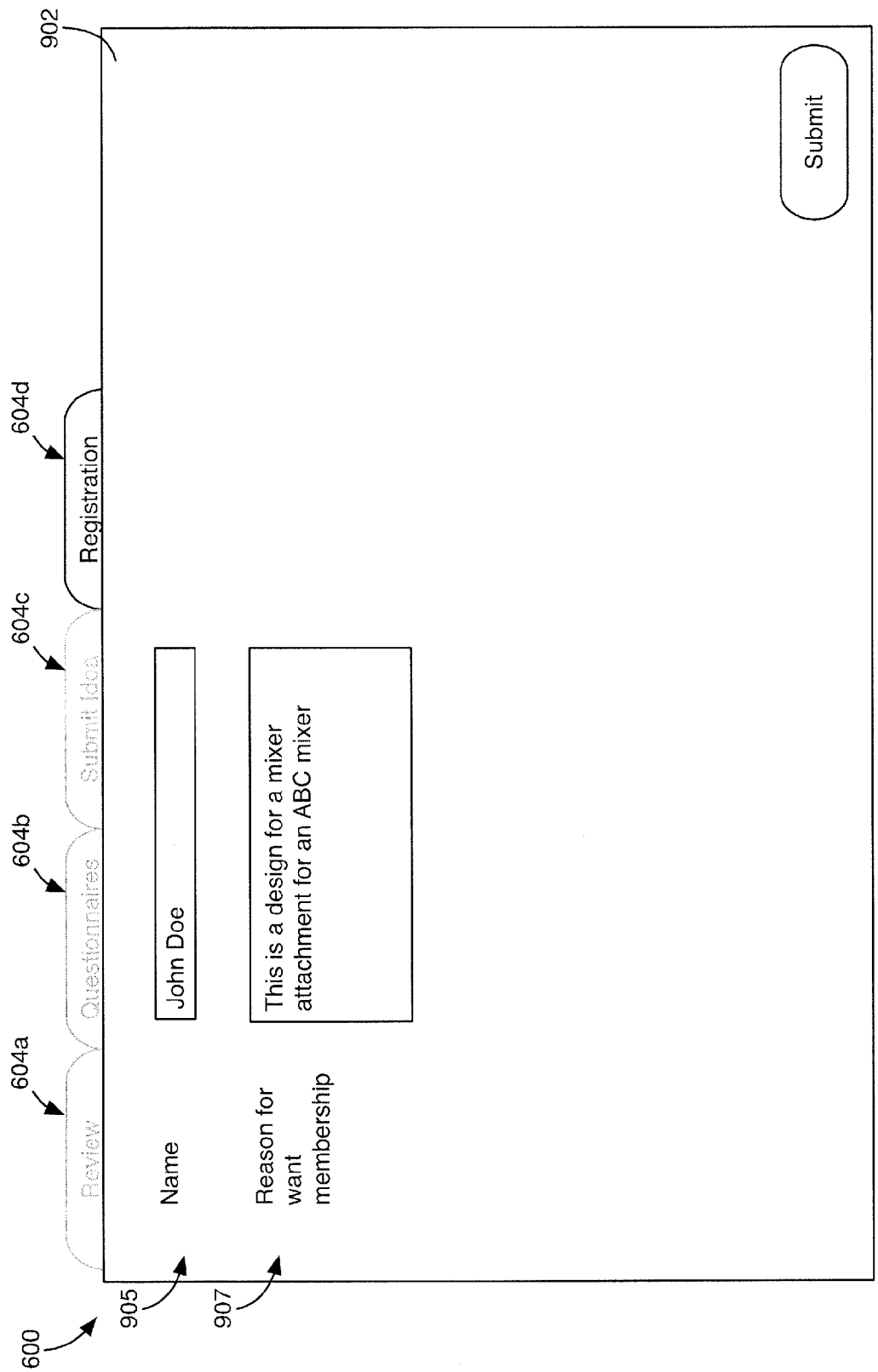
FIG. 9 illustrates a registration page of the exemplary reviewer user interface for registering for first-time access to the system.

Referring to FIG. 6B, the printer dialog box 640 may include various options that the reviewer can select to control how the 3D image is printed. For example, a material selection control 642 may be displayed to allow the reviewer to select a type of material with which the reviewer desires the object to be printed. The material selection control may list various materials along with the costs associated with printing the 3D image using the selected material. A color selection control 644 may be displayed to allow the reviewer to select the desired color of the printed 3D image. A scale control 646 may be displayed to allow the reviewer to specify a scale at which the 3D image should be printed. The configuration options displayed in the printer dialog may be automatically generated based on the configuration options specified by the designer 102 in the configuration page 402, described above. For example, the scale control 646 might not be displayed or might not be editable when the designer 102 indicates that scaling is not allowed.

After receiving the various selections, the printer dialog box 640 may display a printer selection control 655 to allow the reviewer to select a printer upon which to print the 3D image. In this regard, the printers listed in the printer selection control 655 may correspond to those printers that are capable of printing the 3D image based on the desired configuration. For example, the printers listed in the printer selection control 655 may be limited to those that are able to 3D print the 3D image in red colored plastic, and at a size that is two times the size of the 3D image.

A questionnaire page 702 may include a list of questionnaire questions 705. In some implementations, the questionnaire page 702 is only shown to certain reviewers, such as the external reviewers 130. The questions 705 displayed may correspond to those specified by the designer 102 via the questionnaire creation page 302 of the designer user interface 200. The questionnaire page 702 may display the text of the questions specified by the designer 102 along with various response controls for receiving responses to the questions. The questions and response controls may be automatically generated by the system 110 based upon the questions specified by the designer 102. For example, a yes/no response control 707 may be automatically generated when the designer 102 specifies the desired response type as being a yes or no. Similarly, a rating response control 709 may be automatically generated when the designer 102 specifies the desired response type to be a rating such as a value between 1 and 5. A text response control 711 may be generated when the desired response type is a written response. Other types of response controls, for indicating a value such as sliders and the like, may be utilized.

A product submission page 802 may allow an individual to upload his own product for consideration. In some implementations, the product submission page 802 may only be shown to certain individual, such as an individual who is identified as an external reviewer 130. The product submission page 802 may include user interface elements that facilitate specifying a product name 805, product description 807 for providing an overall description of the product, a representative image 810 of the product, and design file 812 that corresponds to a 3D image of the product. Selection of a submit control 814 may cause the design file to be uploaded to the system 110.

After submission, the system 110 may notify designers 102, internal reviewers 104, and/or other of the submission. Those notified may log in to the system 110 to consider the product submission. If the designers and/or internal reviewers (102,104) approve of the idea, a new project may be created based on the submitted product, and the process of review by internal and external reviewers (104, 130) and revision by the designer 102 may proceed, as described above.

In some implementations, if the final product associated with the submission proceeds to production and/or is 3D printed by external reviewers 130, the individual who submitted the product concept might be rewarded with credits toward other product purchases, cash, and/or may be provided with other forms of rewards.

A registration page 902 may be provided to allow individuals outside of the enterprise to register as external reviewers 130. In some implementations, the registration page 902 may only be shown to individuals attempting to access the system 110 from outside of the enterprise environment 100. The registration page 902 may include user interface elements that facilitate specifying information for identifying the individual, such as the individual's name 905. Other information (e.g., address, phone number, etc.) may be provided. A field 907 for providing the reason for requesting membership may be provided. The individual may, for example, indicate that he is a so-called power user or passionate user of products manufactured by the company associated with the enterprise 100. For example, where the product is related to cooking, the individual may indicate that he is a chef of some sort and that he would like to have a say in the development of products manufactured by the company.

The request for registration may be communicated to members within the enterprise 100 such as one or more designers 102, internal reviewers 104, and/or other individuals within the enterprise with the authority to grant access to the system 110. If the request is approved, the individual may be provided with a username, password, etc., that allows the user to access the system 110 as an external reviewer 130. The products accessible to the individual for reviewing may be limited to those products being considered by the enterprise that would benefit from a review by the individual.

Operations of the system 110 are described with reference to the block diagrams illustrated in FIGS. 10 and 11. Some or all of the operations may be implemented via instruction code that resides on non-transitory computer readable storage media of the system 110. Execution of the instruction code by the system 110 may cause the system 110 to perform the operations described in the block diagrams.

Figure 10:
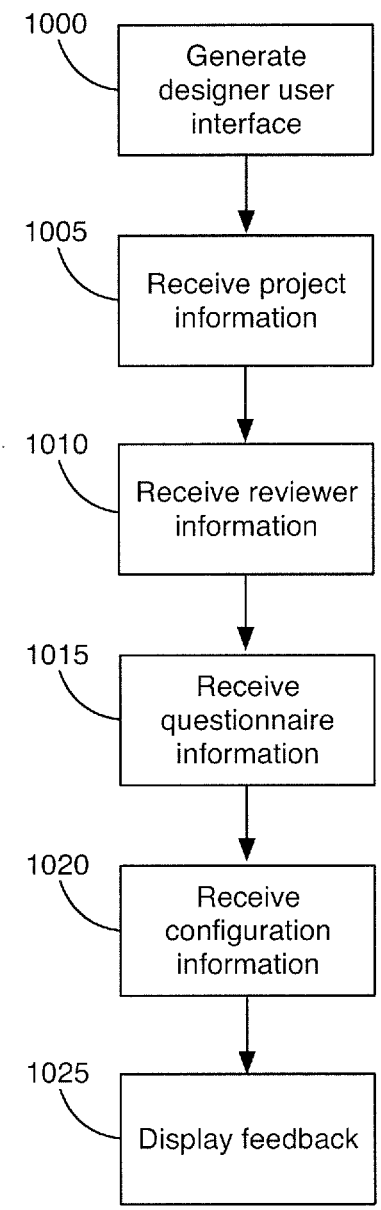
FIG. 10 illustrates a group of exemplary operations that may be performed by the system in displaying and receiving information associated with the exemplary designer user interface.

The operations illustrated in FIG. 10 correspond to operations that may be performed by the system 110 when a designer 102 is creating a new project, editing an existing project, etc. At block 1000, the server 112 of the system 110 may generate a designer user interface 200 to be accessed by the designer 102 for creating a new project and/or editing an existing project. For example, the designer 102 may login to the system 110 for the purpose of starting a new project, uploading a new version of a 3D image in an existing project, reviewing comments associated with a particular 3D image version, etc. To facilitate this, the server 112 may generate the designer user interface 200 described above, which may include various pages including a project creation/edit page 202, a questionnaire creation page 302, a configuration page 402, and a designer review page 502. The designer user interface 200 may include other pages.

At block 1005, the system 110 may receive project information. For example, the designer 102 may populate the various fields on the project creation page 202 with the appropriate information. The designer 102 may then upload a 3D image to the system 110. The system 110 may store the information to the database 114.

At block 1010, the system 110 may receive reviewer information. For example, the designer 102 may specify one or more reviewers tasked with reviewing and approving the product. For example, the designer 102 may add contact information associated with the reviewers into the reviewer assignment control 218 described above, such as email addresses of the reviewers. The system 110 may associate this information with the project and store the information to the database 114.

At block 1015, the system 110 may receive questionnaire information. For example, the designer 102 may switch to the questionnaire creation page 302 and may specify one or more questions that will be part of a questionnaire communicated at a later point to the external reviewers 130. The designer 102 may specify the text for each question along with a type of response expected in return, such as a yes/no response, a numeric value or range, a text response, and/or a different response type. The system 110 may associate this information with the project and/or a specific version of a 3D image of the project and store the information to the database 114.

At block 1020, the system 110 may receive configuration information. For example, the designer 102 may switch to the configuration page 402 and may specify various configurations available for 3D printing the 3D object type. For example, the designer 102 may specify a type of material that may be utilized for 3D printing, a cost associated with 3D printing the 3D image using a given material. The designer 102 may specify other attributes such as the type of color in which the 3D image may be 3D printed and whether the 3D image can be 3D printed at different scale sizes. The system 110 may associate this information with the project and/or a specific version of a 3D image of the project and store the information to the database 114.

At block 1025, the system 110 may display comments and other forms of feedback related to the 3D image or to a particular version of the 3D image. For example, the designer 102 may switch to the designer review page 502 to review comments received from reviewers along with the results of the questionnaire. The designer review page 502 may include user interface elements that facilitate selecting a particular version of the 3D image for which comments and other forms of feedback are sought. The system 110 may identify comments and other feedback associated with the selected version from the database 114 and retrieve those items for display.

Figure 11:
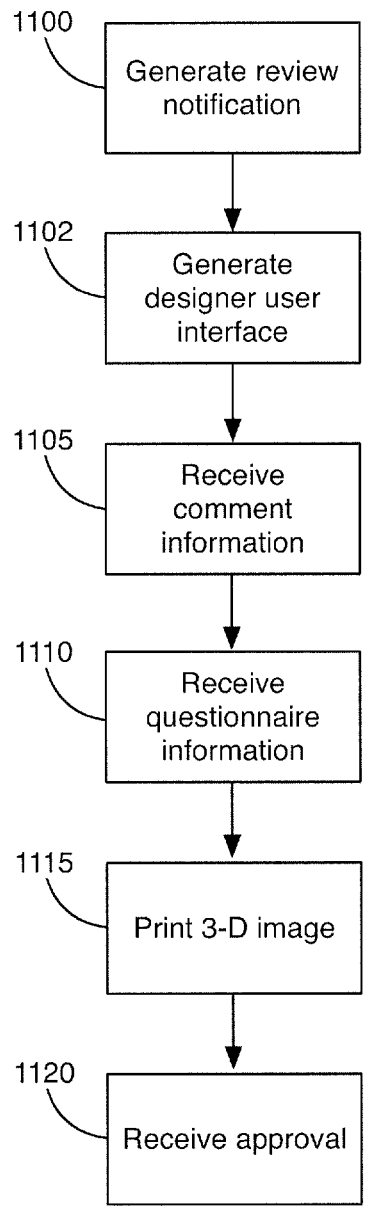
FIG. 11 illustrates a group of exemplary operations that may be performed by the system in displaying and receiving information associated with the exemplary reviewer user interface.

The operations illustrated in FIG. 11 correspond to operations that may be performed by the system 110 to allow a reviewer to review and provide comments on a 3D image.

At block 1100, the server 112 of the system 110 may communicate a notification to one or more internal and/or external reviewers (104,130) to notify the reviewers that a new 3D image version has been uploaded to the system 110 by the designer 102 and is ready for review. For example, the system 110 may search the database 114 for reviewers associated with the project. The system 110 may then communicate an email message or other form of message to the reviewers to let them know that their comments and/or feedback are required.

At block 1102, the server 112 of the system 110 may generate a reviewer user interface 600 to be accessed by the reviewer. For example, the reviewer may login to the system 110 for the purpose of reviewing a 3D image associated with a product. The server 112 may then generate the reviewer user interface 600 described above, which may include various pages including a review page 600 and a questionnaire page 702, etc. The reviewer user interface 600 may include other pages. Information displayed to the reviewer may be retrieved by the system 110 from the database 114.

At block 1105, comments and other information associated with a particular 3D image may be received by the system 110. For example, controls for selecting a project and a particular version of 3D image that is part of the project may be provided on the review page 600. An image viewer 610 may be generated for displaying the 3D image associated with the selected version. A comment field 609 may be provided for specifying comments. The reviewer may select a project, a desired 3D image version, and the view the 3D image in the image viewer 610. The reviewer may then enter comments in the comment field 609 related to the 3D image and submit these to the system 110. In some implementations, controls may be provided to allow the reviewer to view the comments provided by others on the same version of the 3D image or different versions of the 3D image.

At block 1110, questionnaire information may be received. For example, the reviewer may switch to questionnaire page 702 and may view various questions and provide answers to the questions. In some implementations, the questionnaire page 702 is only shown to certain reviewers, such as the external reviewers 130. The questionnaire page 702 may display the text of the questions specified by the designer 102 along with various response controls for receiving responses to the questions. The results of the questionnaire may be compiled by the system 110 and stored into the database. The system 110 may determine and store average results for various types of questions to the database 114 and/or compute the averages and otherwise aggregate the results when the designer 102 selects the designer review page 502.

At block 1115, a reviewer may select a 3D print control 615 for sending a copy of the 3D image shown in the viewer to a 3D printer. Selection of this control 615 may cause the printer dialog box 640 illustrated in FIG. 6B to appear. The printer dialog box 640 may include various options that the reviewer can select to control how the 3D image is printed. The configuration options displayed in the printer dialog box 640 may be automatically generated based on the configuration options specified by the designer 102 in the configuration page 402, described above. The printer dialog box 640 may display a printer selection control to allow the reviewer to select a printer upon which to print the 3D image. The printers listed in the printer control may correspond to those printers that are capable of printing the 3D object based on the desired configuration. Upon selection of a 3D printer, the 3D image may be communicated to the 3D printer and delivered at a later time to the reviewer.

At block 1120, the system 110 may receive approval of the 3D image. For example, a reviewer may approve of the 3D image after having reviewed several versions of the 3D image and/or after having reviewed 3D printed samples of the 3D image. In some implementations, the option to approve a design is displayed to the internal reviewers 104 rather than the external reviewers 130. In addition, in certain implementations, external reviewers 130 are barred from reviewing versions of the 3D image of a product via the system 110 until after the internal reviewers 104 have approved the version. In this regard, the system may block access to a given project until all the internal reviewers 104 have granted approval.

Figure 12:
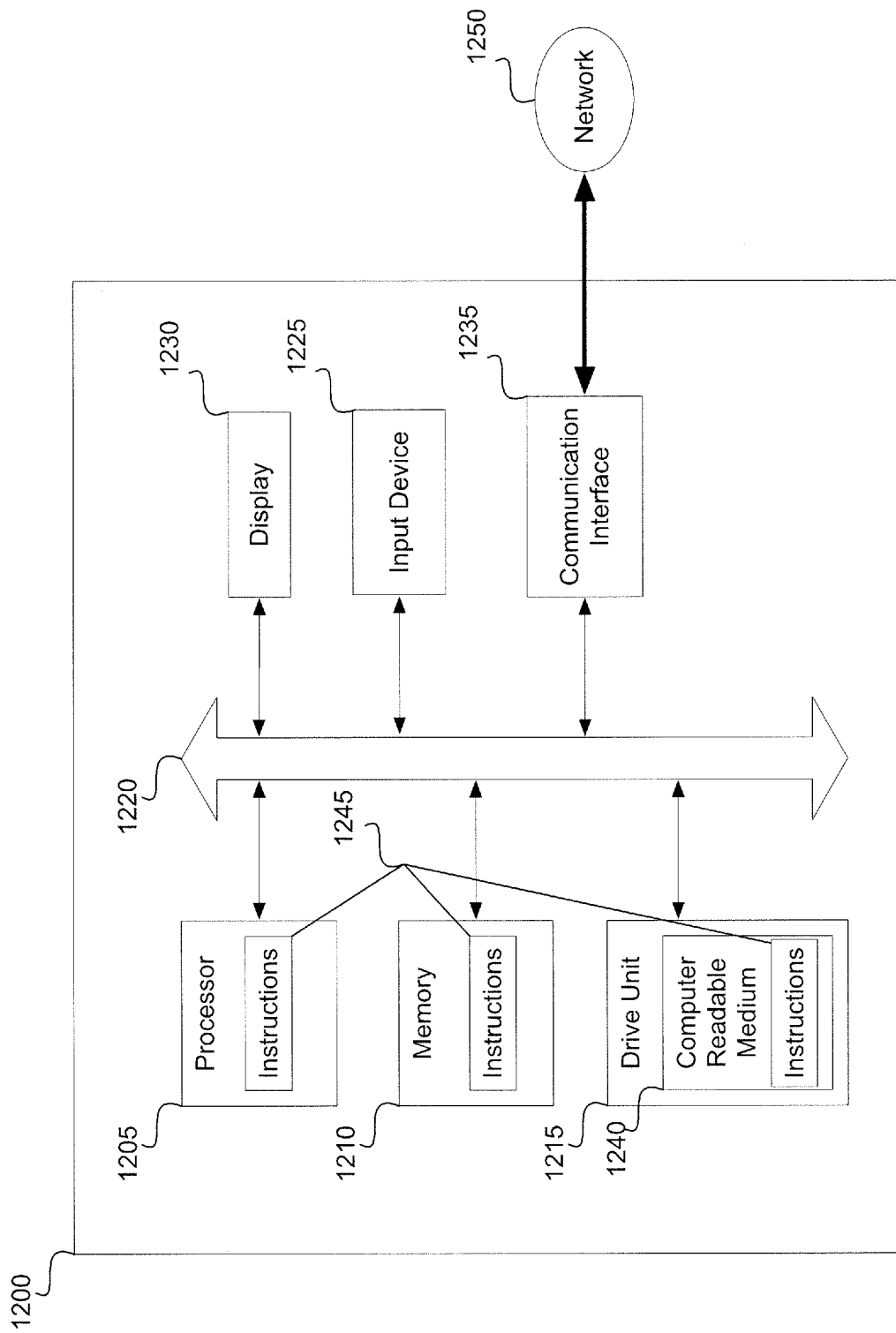
FIG. 12 illustrates a computer system that may implement various modules of system.

FIG. 12 illustrates a computer system 1200 that may form part of or implement the system 110, printing system 120, or any other module referenced herein. The computer system 1200 may include a set of instructions 1245 that the processor 1205 may execute to cause the computer system 1200 to perform any of the operations described above. The computer system 1200 may operate as a stand-alone device or may be connected, e.g., using a network, to other computer systems or peripheral devices.

In a networked deployment, the computer system 1200 may operate in the capacity of a server or as a client-user computer in a server-client user network environment, or as a peer computer system in a peer-to-peer (or distributed) network environment. The computer system 1200 may also be implemented as or incorporated into various devices, such as a personal computer or a mobile device, capable of executing the instructions 1245 (sequential or otherwise) that specify actions to be taken by that machine. Further, each of the systems described may include any collection of sub-systems that individually or jointly execute a set, or multiple sets, of instructions to perform one or more computer functions.

The computer system 1200 may include one or more memory devices 1210 on a bus 1220 for communicating information. In addition, code operable to cause the computer system to perform any of the operations described above may be stored in the memory 1210. The memory 1210 may be a random-access memory, read-only memory, programmable memory, hard disk drive or any other type of memory or storage device.

The computer system 1200 may include a display 1230, such as a liquid crystal display (LCD), a cathode ray tube (CRT), or any other display suitable for conveying information. The display 1230 may act as an interface for the user to see the functioning of the processor 1205, or specifically as an interface with the software stored in the memory 1210 or in the drive unit 1215.

Additionally, the computer system 1200 may include an input device 1225, such as a keyboard or mouse, configured to allow a user to interact with any of the components of system 1200.

The computer system 1200 may also include a disk or optical drive unit 1215. The object database 125, printer database 130, and any other forms of storage referenced herein may be stored on the disk drive unit 1215. The disk drive unit 1215 may include a computer-readable medium 1240 in which the instructions 1245 may be stored. The instructions 1245 may reside completely, or at least partially, within the memory 1210 and/or within the processor 1205 during execution by the computer system 1200. The memory 1210 and the processor 1205 also may include computer-readable media as discussed above.

The computer system 1200 may include a communication interface 1235 to support communications via a network 1250. The network 1250 may include wired networks, wireless networks, or combinations thereof. The communication interface 1235 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for communicating product development information, the method comprising:

generating, by a server, a first interface configured to facilitate uploading data that defines a 3D image of a product to the server, specifying reviewer identifying data associated with one or more reviewers for reviewing the 3D image, and for specifying 3D printer configuration options available to reviewers to facilitate 3D printing the 3D image;

receiving, via the first interface, the 3D image, the reviewer identifying data, and the 3D printer configuration options;

generating, by a 3D printing system, a listing of 3D printers capable of printing the 3D image based on the 3D printer configuration options;

generating, by the server, a second interface that includes a viewer that facilitates viewing the 3D image, one or more fields for specifying feedback information related to the 3D image, and the listing of 3D printers generated by the 3D printing system;

receiving, via the second interface, a selection of a 3D printer listed in the listing;

communicating, by the printing system, the 3D image to the selected 3D printer, wherein the selected 3D printer subsequently prints an object that corresponds to the 3D image;

receiving, via the second interface, feedback information related to the object that corresponds to the 3D image; and communicating the feedback information to a designer associated with the 3D image.

2. The method according to claim 1, wherein:
the first interface is configured to facilitate uploading a revised version of the 3D image and for specifying version information associated with the revised version, and wherein the second interface is configured to facilitate selection of a desired version of the 3D image for review.

3. The method according to claim 2, further comprising:
receiving, via the second interface, feedback information related to the revised version of the 3D image and associating the feedback information related to the revised version with the revised 3D image.

4. The method according to claim 1, wherein:
the first interface is configured to facilitate specifying one or more queries for which feedback is sought and a feedback type for each of the one or more queries; and
the second interface is configured to display the one or more queries and to receive feedback associated with the one or more queries.

5. The method according to claim 4, wherein the feedback type is one of: a text response, a numeric range, and a Boolean value.

6. The method according to claim 1, further comprising communicating, by the server, a notification to the one or more reviewers to indicate that the 3D image has been received and is ready for review.

7. The method according to claim 1, further comprising aggregating feedback information received from a plurality of reviewers, and communicating the aggregated feedback information to the designer.

8. The method according to claim 7, wherein aggregating feedback information further comprises calculating an average value associated with the feedback information and communicating the average value to the designer.

9. A system for communicating product development information, the system comprising:
a server configured to:

generate a first interface configured to facilitate uploading data that defines a three dimensional (3D) image associated with a product to the server, specifying reviewer identifying data associated with one or more reviewers for reviewing the 3D image, and for specifying 3D printer configuration options available to reviewers to facilitate 3D printing the 3D image;

receive the 3D image, the reviewer identifying data, and the 3D printer configuration options; and a 3D printing system configured to:
generating a listing of 3D printers capable of printing the 3D image based on the 3D printer configuration options;

wherein the server is further configured to:
generate a second interface that includes a viewer that facilitates viewing the 3D image, one or more fields for specifying feedback information related to the 3D image, and the listing of 3D printers generated by the 3D printing system;

receive, via the second interface, a selection of a 3D printer listed in the listing;

wherein the 3D printing system is further configured to:
communicate the 3D image to the selected 3D printer, wherein the selected 3D printer subsequently prints an object that corresponds to the 3D image;

wherein the server is further configured to:
receive, via the second interface, feedback information related to the object that corresponds to the 3D image; and
communicate the feedback information to a designer associated with the 3D image.

10. The system according to claim 9, wherein:
the first interface is configured to facilitate uploading a revised version of the 3D image and for specifying version information associated with the revised version, and
wherein the second interface is configured to facilitate selection of a desired version of the 3D image for review.

11. The system according to claim 10, wherein the server is further configured to:
receive feedback information related to the revised version of the 3D image and to associate the feedback information related to the revised version with the revised 3D image.

12. The system according to claim 9, wherein:
the first interface is configured to facilitate specifying one or more queries for which feedback is sought and a feedback type for each of the one or more queries; and
the second interface is configured to display the one or more queries and to receive feedback associated with the one or more queries.

13. The system according to claim 12, wherein the feedback type is one of: a text response, a numeric range, and a Boolean value.

14. The system according to claim 9, wherein the server is further configured to: communicate a notification to the one or more reviewers to indicate that the 3D image has been received and is ready for review.

15. The system according to claim 9, wherein the server is further configured to: aggregate feedback information received from a plurality of reviewers, and communicate the aggregated feedback information to the designer.

16. The system according to claim 15, wherein in aggregating feedback information, the server is further configured to calculate an average value associated with the feedback information and to communicate the average value to the designer.

17. A non-transitory machine-readable storage medium having stored thereon a computer program comprising at least one code section for communicating product development information, the at least one code section being executable by a machine for causing the machine to perform acts of:
    generating a first interface configured to facilitate uploading data that defines a 3D image of a product to the server, specifying reviewer identifying data associated with one or more reviewers for reviewing the 3D image, and for specifying 3D printer configuration options available to reviewers to facilitate 3D printing the 3D image;
    receiving the 3D image, the reviewer identifying data, and the 3D printer configuration options;
    generating a listing of 3D printers capable of printing the 3D image based on the 3D printer configuration options;
    generating a second interface that includes a viewer that facilitates viewing the 3D image, one or more fields for specifying feedback information related to the 3D image, and the listing of 3D printers;
    receiving, via the second interface, a selection of a 3D printer listed in the listing;
    receiving, via the second interface, feedback information related to the object that corresponds to the 3D image; and
    communicating the feedback information to a designer associated with the 3D image.

18. The non-transitory machine-readable storage medium according to claim 17, wherein:
    the first interface is configured to facilitate uploading a revised version of the 3D image and for specifying version information associated with the revised version, and
    wherein the second interface is configured to facilitate selection of a desired version of the 3D image for review.

\* \* \* \* \*